No. 114,371.  
PATENTED MAY 2, 1871.

S. W. TYLER.  
MOLD FOR MAKING CUSHIONED BELTING.

2 SHEETS—SHEET 1

Witnesses:  
R. T. Campbell  
J. W. Campbell

Inventor  
Samuel W. Tyler  
by  
Mason, Fenwick & Lawrence

No. 114,371. PATENTED MAY 2, 1871.
S. W. TYLER.
MOLD FOR MAKING CUSHIONED BELTING.

2 SHEETS—SHEET 2.

Witnesses.
R. Campbell
J. C. Campbell

Inventor
Samuel W. Tyler
by
Mason, Fenwick & Lawrence

United States Patent Office.

SAMUEL W. TYLER, OF TROY, NEW YORK.

Letters Patent No. 114,371, dated May 2, 1871; antedated April 27, 1871.

IMPROVEMENT IN MOLDS FOR MAKING CUSHIONED BELTING.

The Schedule referred to in these Letters Patent and making part of the same.

*To all whom it may concern:*

Be it known that I, SAMUEL W. TYLER, of Troy, in the county of Rensselaer and State of New York, have invented a Mold for Making Cushioned Belting; and I do hereby declare that the following is a full, clear, and exact description thereof, reference being had to the accompanying drawing making part of this specification, in which—

Figure 1:
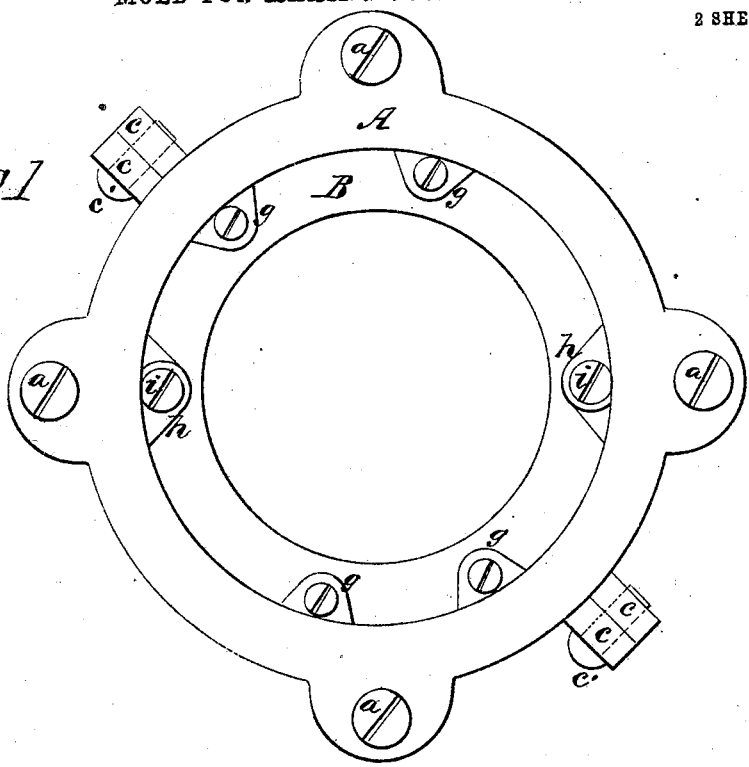

Figure 1, plate 1, is a view of the top of the mold.

Figure 2:
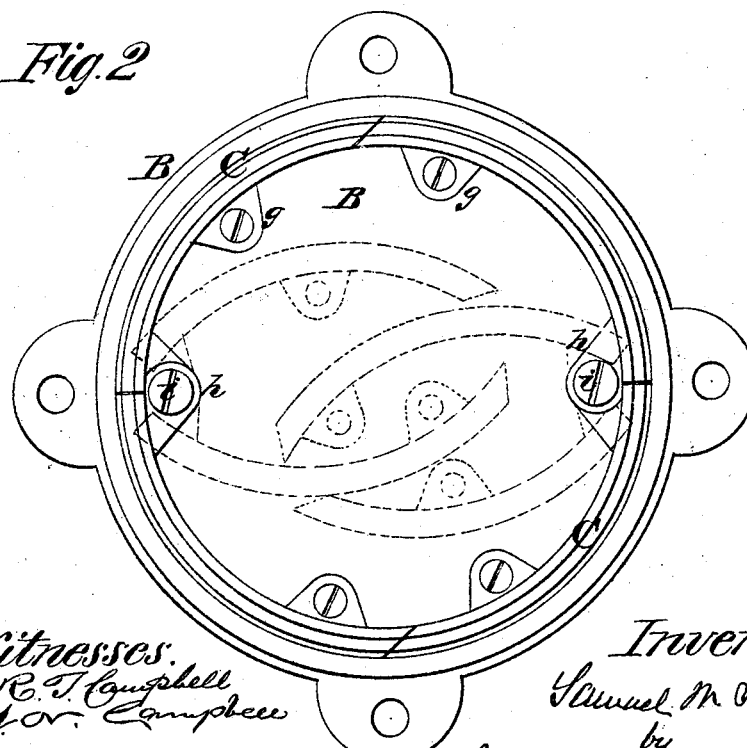

Figure 2, plate 1, is a plan view of the mold, with its cap and external case removed.

Figure 3:
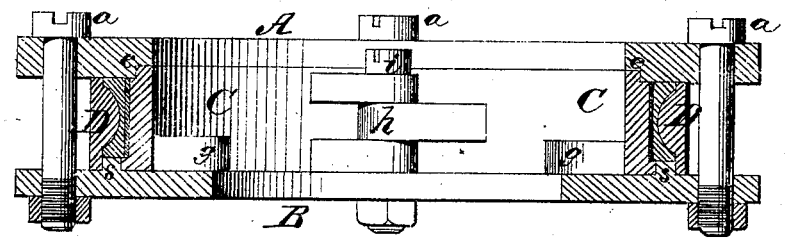

Figure 3, plate 2, is a diametrical section through the mold adapted for making concave-faced belting.

Figure 4:
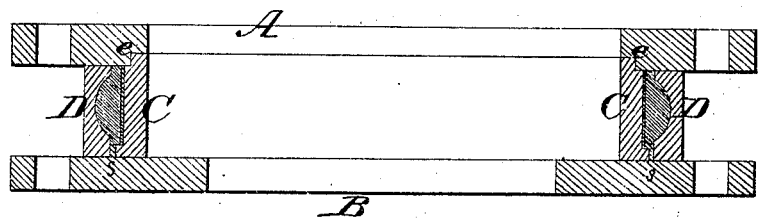

Figure 4, plate 2, is a diametrical section through a mold for making convex-faced belting.

Figure 5:
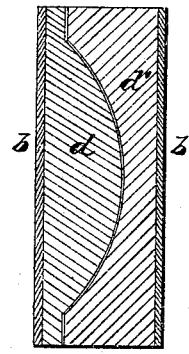

Figure 5, plate 2, is a cross-section through two pieces of cushioned belting.

Similar letters of reference indicate corresponding parts in the several figures.

This invention relates to a new mold which is adapted for the manufacture of belting having an elastic or yielding cushion formed on a comparatively non-elastic foundation. Such belts are especially useful in flax-harvesters for extracting the flax from the ground, as described in my Letters Patent of the United States numbered 62,090, and they are also useful for other purposes.

The nature of my invention consists in a sectional mold adapted for the production of cushioned belting, which mold is so constructed that it will readily receive the material of which the belts are composed, mold the same, and allow the finished belts to be conveniently removed from it, as will be hereinafter explained.

To enable others skilled in the art to understand my invention, I will explain its construction and operation.

In the accompanying drawing—

A and B represent, respectively, the top and bottom sections of the mold. These sections are rings which are constructed with ears on their peripheries to receive clamping-bolts, *a a*, by which the several sections composing the mold are secured together.

Between the cap and base-sections A B are two rings, C D, between which there is a space in which the belt is formed.

The ring D forms the outer vertical wall of the mold, and is divided or made of halves united together by screws *c' c'*, that pass through lugs *c c* on said halves or semicircles.

This external ring may present either a convex surface to produce a concave-face belt, *d'*, as shown in fig. 3; or this surface may be concave, as in fig. 4, to produce a convex belt, *d;* or it may be of any other shape desired.

This ring D is centered by an annular ledge, *s*, on the bottom mold-section B.

The inner ring C presents to the mold-chamber a plain surface, and is centered between the cap and bottom sections by rebates, *e*.

Ring C is secured to the base-section B by means of screws, which pass through ears formed on this ring, but the ring D is not permanently secured to the said base-section.

I prefer to construct the ring C as shown in fig. 2, to wit, of segments hinged to the base-plate B at *i i*. By thus constructing this ring it can be contracted, as shown in dotted lines, fig. 2, for the purpose of allowing the material which constitutes the foundation of the belt to be tightly stretched around the ring, and also to allow a ready removal from this ring of the finished belt.

I do not confine myself, however, to the segmental ring C, as this ring C and bottom section B may be constructed of one piece, or each one may be constructed of one piece and afterward bolted together.

The ducking, webbing, or other material which is to form the foundation of the belt is stuffed or prepared with rubber and stretched tightly around the ring C, the sections A B having been previously removed.

The section B is then adjusted in its place and the mold stuffed with rubber, after which the mold is locked up and the material subjected to the well-known vulcanizing process.

After this process the screws *a a* are removed and the finished belt separated from the mold.

I do not confine myself to the manufacture of vulcanized rubber belts, as belts may be made in my mold of any suitable plastic material which will afford an elastic surface or cushion.

Having described my invention,

What I claim as new, and desire to secure by Letters Patent, is—

1. A sectional mold adapted for the production of elastic cushioned belting, constructed substantially as described.

2. The segmental inner ring section C, in combination with detachable mold sections A B D, substantially as and for the purposes described.

3. The ring C, secured to the base-section B, in combination with the movable sections A B D, substantially as and for the purposes described.

SAMUEL W. TYLER.

Witnesses:
R. T. CAMPBELL,
J. N. CAMPBELL.